(12) United States Patent
Portune et al.

(10) Patent No.: US 12,241,372 B2
(45) Date of Patent: Mar. 4, 2025

(54) SEAL ASSEMBLY FOR A ROTOR SHAFT OF A GAS TURBINE

(71) Applicant: General Electric Company, Schenectady, NY (US)

(72) Inventors: Grant Portune, Cincinnati, OH (US); Steven Douglas Johnson, Milford, OH (US); Bryan Jung Woo Hong, Blue Ash, OH (US); Prateek Jalan, Bengaluru (IN); Ravindra Shankar Ganiger, Bengaluru (IN); Narendra Hardikar, Bengaluru (IN); David Yamarthi, Bengaluru (IN)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 18/497,202

(22) Filed: Oct. 30, 2023

(65) Prior Publication Data

US 2024/0384661 A1    Nov. 21, 2024

(30) Foreign Application Priority Data

May 19, 2023  (IN) .............................. 202311035056

(51) Int. Cl.
*F01D 11/00* (2006.01)
*F02C 7/28* (2006.01)

(52) U.S. Cl.
CPC ................ *F01D 11/00* (2013.01); *F02C 7/28* (2013.01); *F05D 2240/55* (2013.01)

(58) Field of Classification Search
CPC ...................................................... F01D 11/00
See application file for complete search history.

(56) References Cited

U.S. PATENT DOCUMENTS

| 4,139,376 | A | 2/1979 | Erickson et al. |
| 4,251,185 | A | 2/1981 | Karstensen |
| 5,593,278 | A | 1/1997 | Jourdain et al. |
| 9,359,908 | B2 | 6/2016 | Bidkar et al. |
| 9,587,746 | B2 * | 3/2017 | Bidkar ................. F01D 11/025 |
| 9,683,451 | B2 | 6/2017 | Sonokawa et al. |

(Continued)

FOREIGN PATENT DOCUMENTS

EP    1467066 B1    12/2007

OTHER PUBLICATIONS

Bidkar et al., U.S. Appl. No. 17/385,331, filed Jul. 26, 2021.
Guijarro Valencia et al., U.S. Appl. No. 17/691,380, filed Mar. 10, 2022.

*Primary Examiner* — Courtney D Heinle
*Assistant Examiner* — Danielle M. Christensen
(74) *Attorney, Agent, or Firm* — Venable LLP; Edward A. Kmett; Michele V. Frank

(57) ABSTRACT

A seal assembly for a gas turbine includes a seal case, and a seal shoe arranged within the seal case. The seal shoe includes a main seal portion that is configured to engage with a radial bearing engagement portion of a rotor shaft, a radial bearing surface that engages with the radial bearing engagement portion of the rotor shaft, at least one hydrodynamic lift cavity extending through the radial bearing surface, and at least one airflow passage extending from a first side of the seal shoe through the at least one hydrodynamic lift cavity and providing airflow communication between the first side of the seal shoe and the at least one hydrodynamic lift cavity.

9 Claims, 11 Drawing Sheets

(56) References Cited

U.S. PATENT DOCUMENTS

| | | |
|---|---|---|
| 9,803,497 B2 | 10/2017 | Le Biez et al. |
| 10,815,814 B2 | 10/2020 | Zelesky et al. |
| 2013/0034423 A1 | 2/2013 | Adaickalasamy et al. |
| 2019/0203842 A1* | 7/2019 | Bidkar ................ F01D 11/003 |
| 2022/0389825 A1* | 12/2022 | Johnson ............... F01D 11/001 |

* cited by examiner

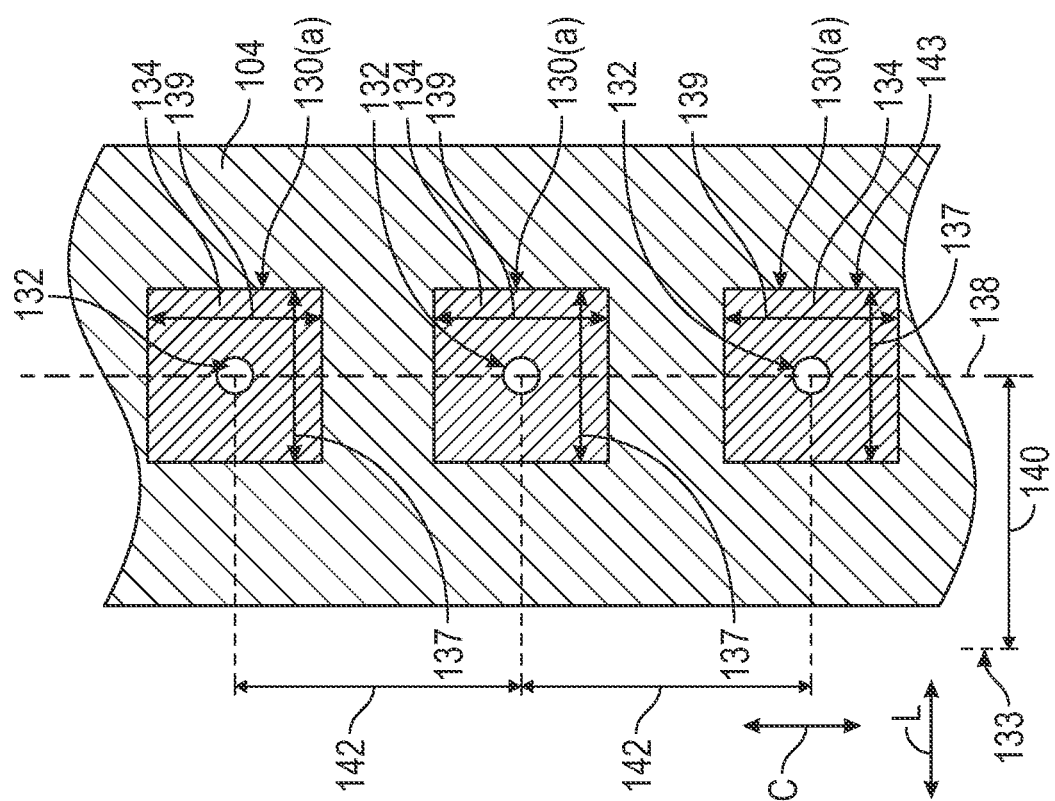
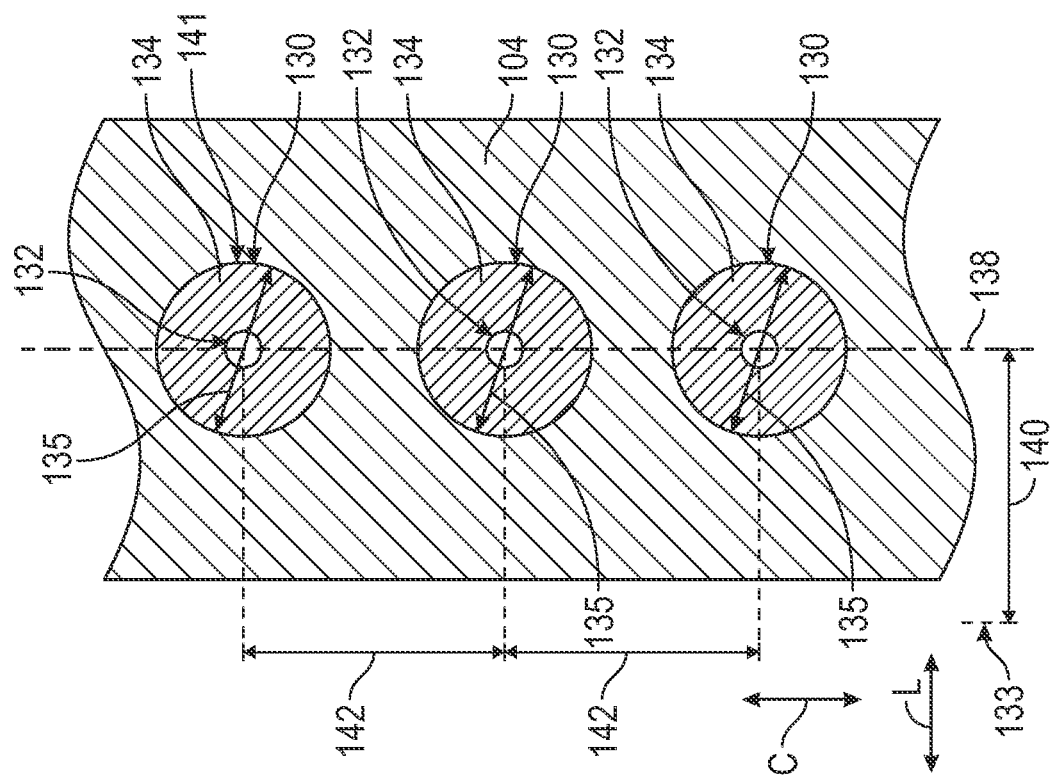

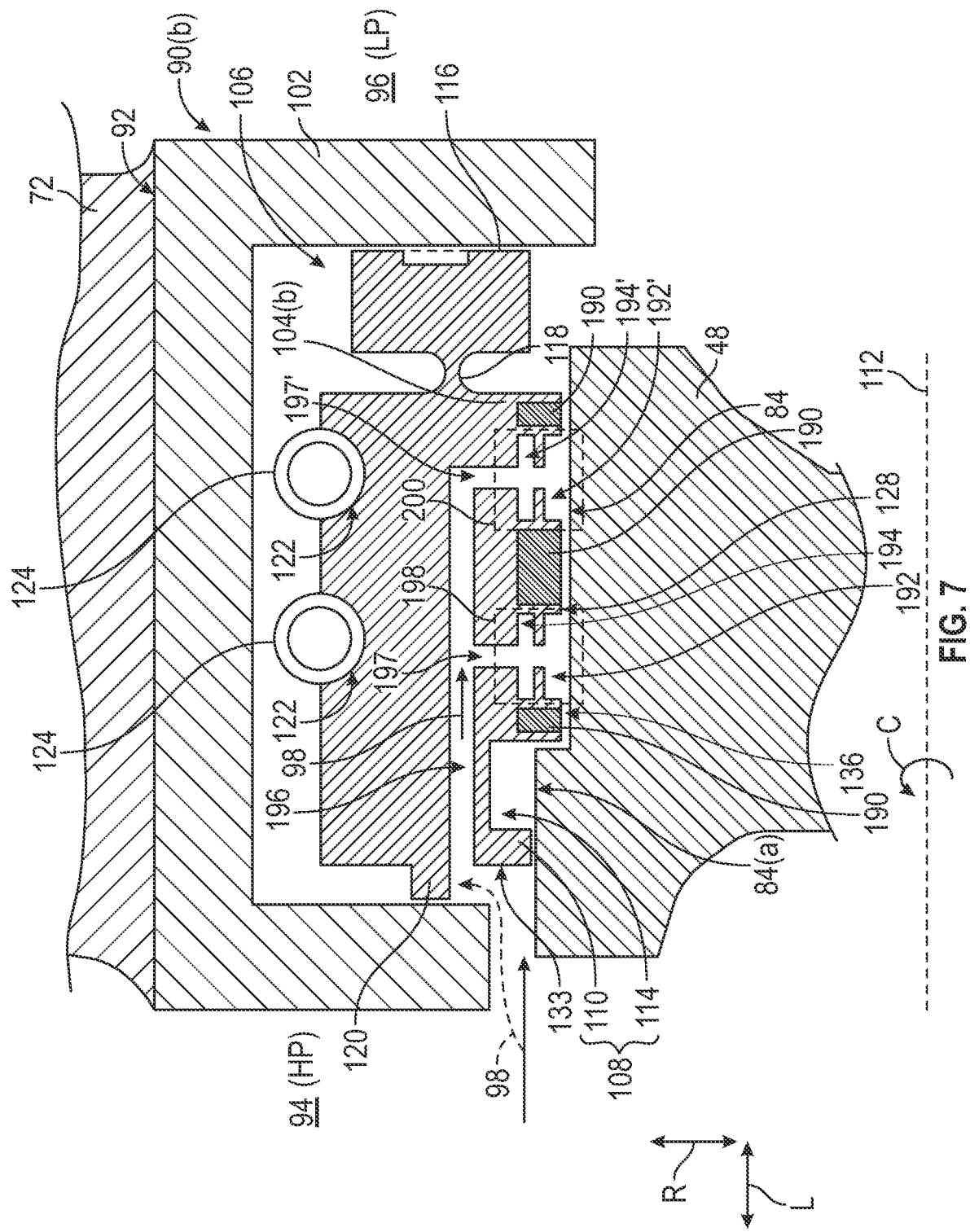

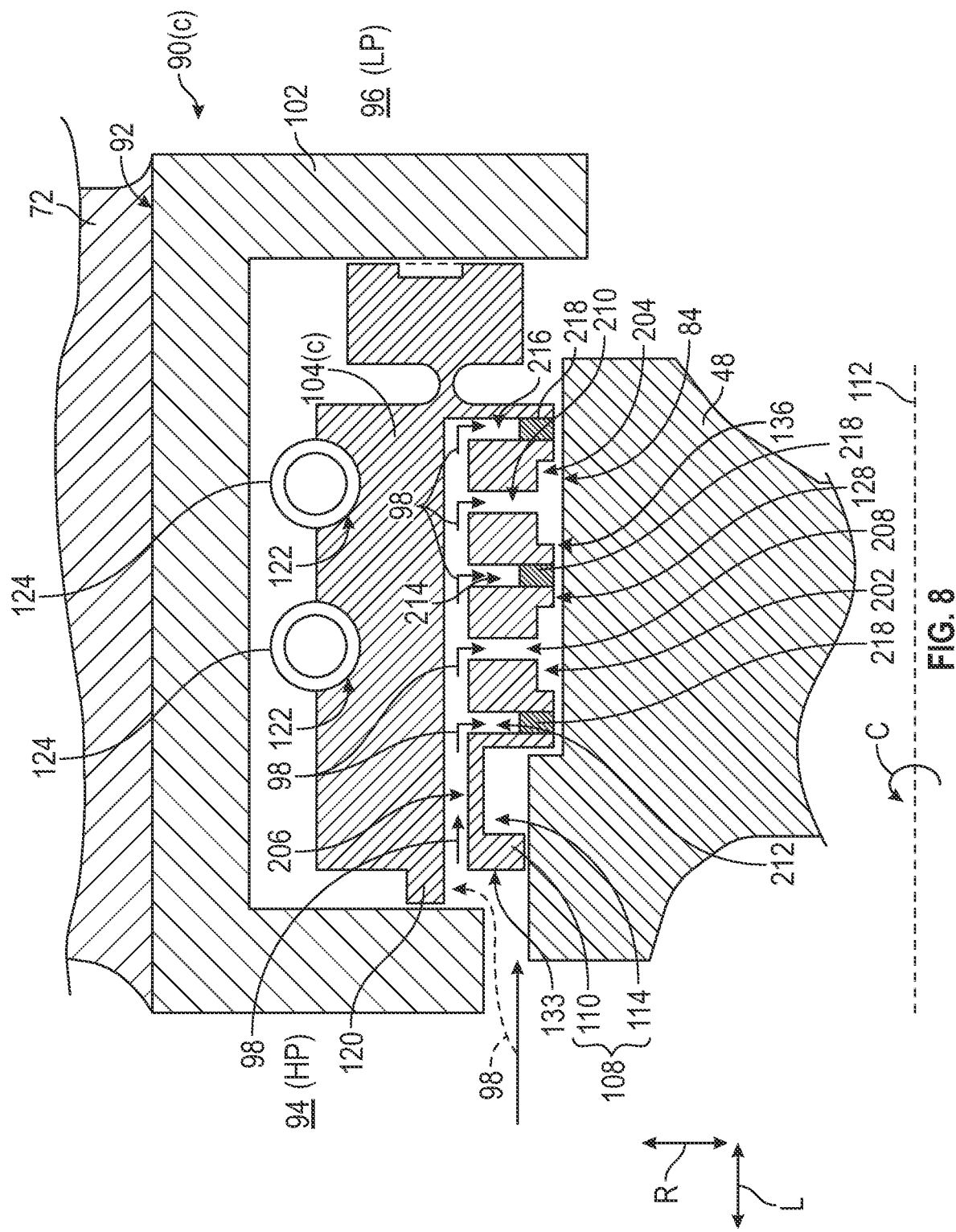

SEAL ASSEMBLY FOR A ROTOR SHAFT OF A GAS TURBINE

CROSS REFERENCE TO RELATED APPLICATIONS

The present application claims the benefit of Indian patent application No. 202311035056, filed on May 19, 2023, which is hereby incorporated by reference herein in its entirety.

TECHNICAL FIELD

The present disclosure relates to a seal assembly for a rotor shaft of a gas turbine engine.

BACKGROUND

A gas turbine engine may generally include a core engine that includes, in a serial flow relationship, a compressor section, a combustion section, and a turbine section. The compressor section and the turbine section may each include a rotor shaft that has rotors, and a stator housing that surrounds the rotor shaft. The stator housing may include stator vanes that are arranged between rotors of the rotor shaft. A combination of a rotor and a set of stator vanes may be referred to as a stage. An inner end of the stator vanes in a stage may include a seal assembly for sealing off a flow of leakage air from a high pressure side of the stator vanes and a low pressure side of the stator vanes.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

FIG. 4A is a partial flattened circumferential cross-sectional view of the one or more hydrodynamic lift cavities, taken at circumferentially extending cut-plane 4-4 of FIG. 3, according to an aspect of the present disclosure.

FIG. 4B depicts a partial flattened circumferential cross-sectional view of an alternate arrangement of the hydrodynamic lift cavities to that shown in FIG. 4A, according to an aspect of the present disclosure.

FIG. 7 depicts a partial cross-sectional view of an alternate arrangement to that shown in FIG. 3 of a seal assembly, according to another aspect of the present disclosure.

FIG. 8 depicts a partial cross-sectional view of an alternate arrangement to that shown in FIG. 3 of a seal assembly, according to another aspect of the present disclosure.

DETAILED DESCRIPTION

Figure 1:
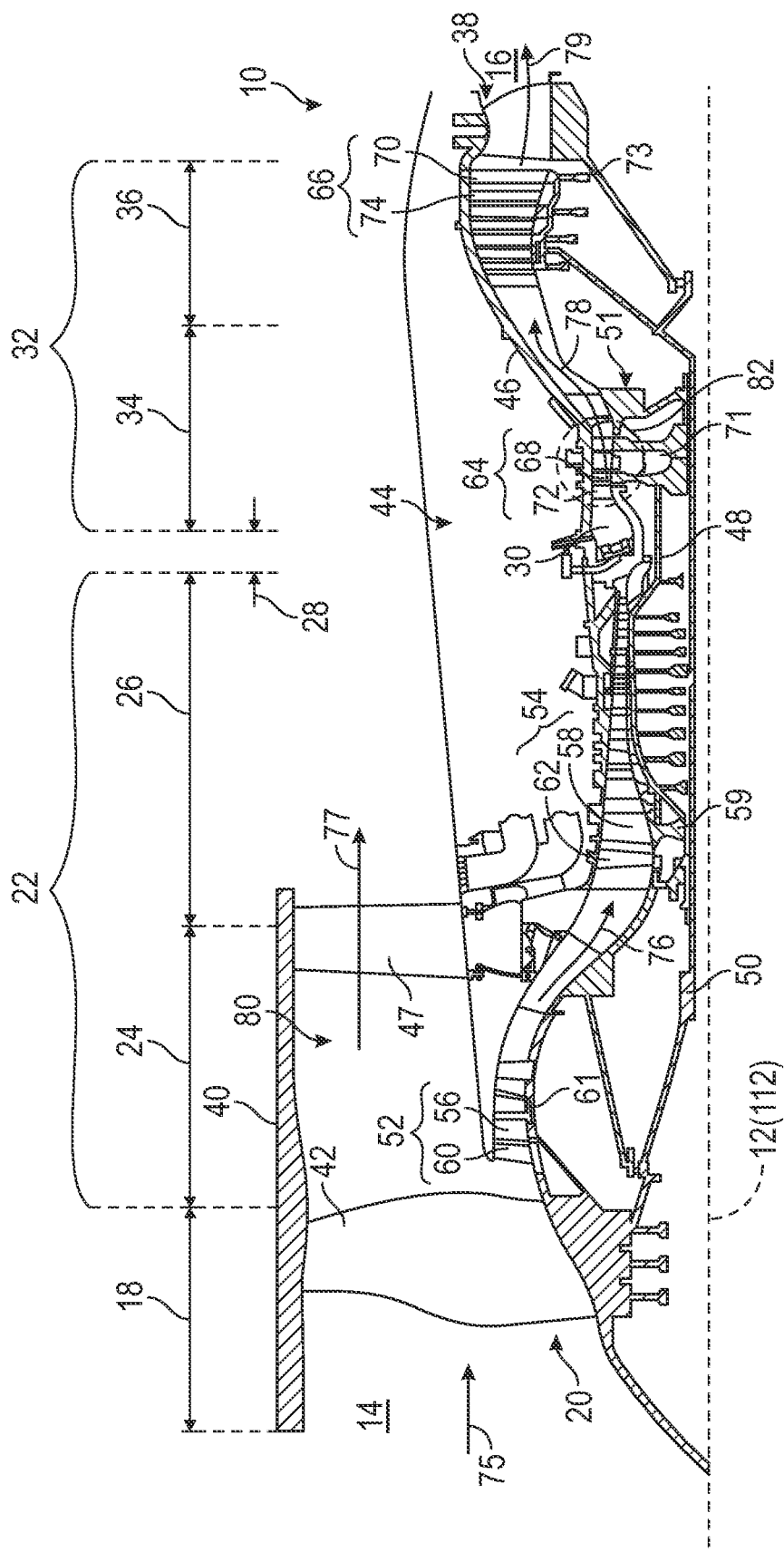
FIG. 1 is a schematic partial cross-sectional side view of an exemplary high by-pass turbofan jet engine, according to an aspect of the present disclosure.

Features, advantages, and embodiments of the present disclosure are set forth, or apparent from, a consideration of the following detailed description, drawings, and claims. Moreover, the following detailed description is exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the spirit and the scope of the present disclosure.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

A gas turbine engine may generally include a core engine that includes, in a serial flow relationship, a compressor section, a combustion section, and a turbine section. The compressor section and the turbine section may each include a rotor shaft that has rotors, and a stator housing that surrounds the rotor shaft. The stator housing may include stator vanes that are arranged between rotors of the rotor shaft. A combination of a rotor and a set of stator vanes may be referred to as a stage. An inner end of the stator vanes in a stage may include a seal assembly for sealing off a flow of leakage air from a high pressure side of the stator vanes and a low pressure side of the stator vanes. The seal assembly may generally extend circumferentially around the rotor shaft so as to form a hybrid radial seal at the rotor shaft. The seal assembly may include, for example, multiple seal shoe segments connected together to form the circumferential seal about the rotor shaft. The seal assembly generally provides a sealing function within a stage between a high pressure side of the seal shoe on a high pressure side of the stage, and a low pressure side of the seal shoe within the stage. Generally, a surface of the seal shoe engages with the rotor shaft, and, during operation, a hydrodynamic lift effect may be provided for between the seal shoe and the rotor shaft. However, during low speed operations, or during certain aircraft maneuvers, rubbing between the seal shoe and the rotor shaft may occur, thereby wearing down the surface of the seal shoe. The wearing down of the seal shoe causes an increase in a gap between the seal shoe surface and the rotor shaft, which may diminish the hydrodynamic lift effect.

The present disclosure addresses the foregoing by providing a seal assembly that adds additional hydrodynamic lift between the seal face and the rotor shaft as the seal face wears down. More particularly, a seal shoe may be provided that has a radial bearing surface that engages with a radial bearing engagement portion of the rotor shaft. At least one hydrodynamic lift cavity may be provided in the seal shoe, where the hydrodynamic lift cavity may extend through the radial bearing surface. An airflow passage extends from a first side of the seal shoe through the hydrodynamic lift cavity and provides airflow communication between the first (high pressure) side of the seal shoe and the at least one hydrodynamic lift cavity. As a result, although the radial bearing surface of the seal shoe may wear down, the hydrodynamic lift cavity can provide additional hydrodynamic lift between the radial bearing surface of the seal shoe and the rotor. In some aspects, additional hydrodynamic lift cavities that may initially be closed (i.e., not exposed to a gap between the radial bearing surface and the rotor shaft) can be exposed by the wear down of the radial bearing surface. Thus, while some hydrodynamic lift cavities may initially be open, once the radial bearing surface wears down to reduce a depth of the hydrodynamic lift cavities, additional hydrodynamic lift cavities may be opened and exposed, thereby adding additional hydrodynamic lift.

Referring now to the drawings, FIG. 1 is a schematic partial cross-sectional diagram of a gas turbine engine 10 in which the present disclosure may be implemented. The gas turbine engine 10 has a generally longitudinally extending axis or engine centerline axis 12 extending from an upstream end 14 to a downstream end 16 of the gas turbine engine 10. The gas turbine engine 10 includes, in downstream serial flow relationship from the upstream end 14 to the downstream end 16, a fan section 18 including a fan 20, a compressor section 22 including a booster or a low pressure (LP) compressor 24 and a high pressure (HP) compressor 26, a combustion section 28 including a combustor 30, a turbine section 32 including an HP turbine 34, and an LP turbine 36, and an exhaust section 38.

The fan section 18 includes a fan casing 40 surrounding the fan 20. The fan 20 includes a set of fan blades 42 disposed radially about the engine centerline axis 12. Together, the LP compressor 24, the HP compressor 26, the combustor 30, the HP turbine 34, and the LP turbine 36 form an engine core 44 of the gas turbine engine 10. The engine core 44 is surrounded by a core casing 46, which can be coupled with the fan casing 40 via a plurality of circumferentially spaced struts or guide vanes 47.

An HP shaft 48 is disposed coaxially about the engine centerline axis 12 of the gas turbine engine 10 and, thus, defines a shaft centerline axis 112. The shaft centerline axis 112 may generally be used to define a first (axial) direction (L) along a length of the shaft centerline axis 112, a second (radial) direction (R) extending outward from the shaft centerline axis 112, and a third (circumferential) direction C extending about the shaft centerline axis 112. The HP shaft 48 drivingly connects the HP turbine 34 to the HP compressor 26. An LP shaft 50 is disposed coaxially about the engine centerline axis 12 and, thus, also defines the shaft centerline axis 112. The LP shaft 50 drivingly connects the LP turbine 36 to the LP compressor 24 and the fan 20. The HP shaft 48 is rotatable about the shaft centerline axis 112 and is coupled to a set of rotatable elements (e.g., rotors), which can collectively be defined as a rotor shaft assembly 51.

The LP compressor 24 includes at least one LP compressor stage 52, and the HP compressor 26 includes at least one HP compressor stage 54. The LP compressor stage 52 includes a set of LP compressor blades 56 (one shown in FIG. 1) connected to a rotor 61 that is driven by the LP shaft 50. The LP compressor blades 56 rotate relative to a corresponding set of static LP compressor stator vanes 60 to compress or to pressurize a stream of fluid (e.g., air) passing through the LP compressor stage 52. Similarly, the HP compressor stage 54 includes a set of HP compressor blades 58 (one shown in FIG. 1) connected to a rotor 59 that is driven by the HP shaft 48. The HP compressor blades 58 rotate relative to a corresponding set of static HP compressor stator vanes 62 to further compress the stream of fluid passing through the HP compressor 26. While a single LP compressor stage 52 and a single HP compressor stage 54 are described above, the LP compressor 24 and the HP compressor 26 may each include multiple stages, where each stage is comprised of a rotor having a set of compressor blades, and a set of static compressor stator vanes.

The HP turbine 34 includes at least one HP turbine stage 64 and the LP turbine 36 includes at least one LP turbine stage 66. The HP turbine stage 64 may include a set of HP turbine blades 68 (one shown in FIG. 1) connected to a turbine rotor 71. The set of HP turbine blades 68 are rotated relative to a corresponding set of static HP turbine stator vanes 72 (one shown in FIG. 1) to extract energy from a stream of heated fluid passing from the combustor 30 through the HP turbine stage 64. Similarly, the LP turbine stage 66 may include a set of LP turbine blades 70 (one shown in FIG. 1) connected to a turbine rotor 73. The set of LP turbine blades 70 are rotated relative to a corresponding set of static LP turbine stator vanes 74 (one shown in FIG. 1) to extract energy from the stream of heated fluid passing from the HP turbine 34 through the LP turbine stage 66. While a single HP turbine stage 64 and a single LP turbine stage 66 are described above, the HP turbine 34 and the LP turbine 36 may each include multiple stages, where each stage is comprised of a rotor having a set of turbine blades, and a set of static turbine stator vanes.

In operation, an inlet airflow 75 enters the fan section 18, and the airflow exiting the fan section 18 is split such that a portion of the airflow is channeled into the LP compressor 24, and another portion of the airflow is channeled through the struts or the guide vanes 47 as a bypass airflow 77 through a bypass passage 80. The airflow provided to the LP compressor 24 is compressed and a pressurized airflow 76 is provided to the HP compressor 26, which further pressurizes the pressurized airflow 76. The pressurized airflow 76 from the HP compressor 26 is mixed with fuel in the combustor 30 and ignited, thereby generating combustion gases 78. Some work is extracted from the combustion gases 78 by the HP turbine 34, which drives the HP compressor 26. The combustion gases 78 are then discharged into the LP turbine 36, which extracts additional work to drive the LP compressor 24. Exhaust gas 79 is ultimately discharged from the gas turbine engine 10 via the exhaust section 38.

Figure 2:
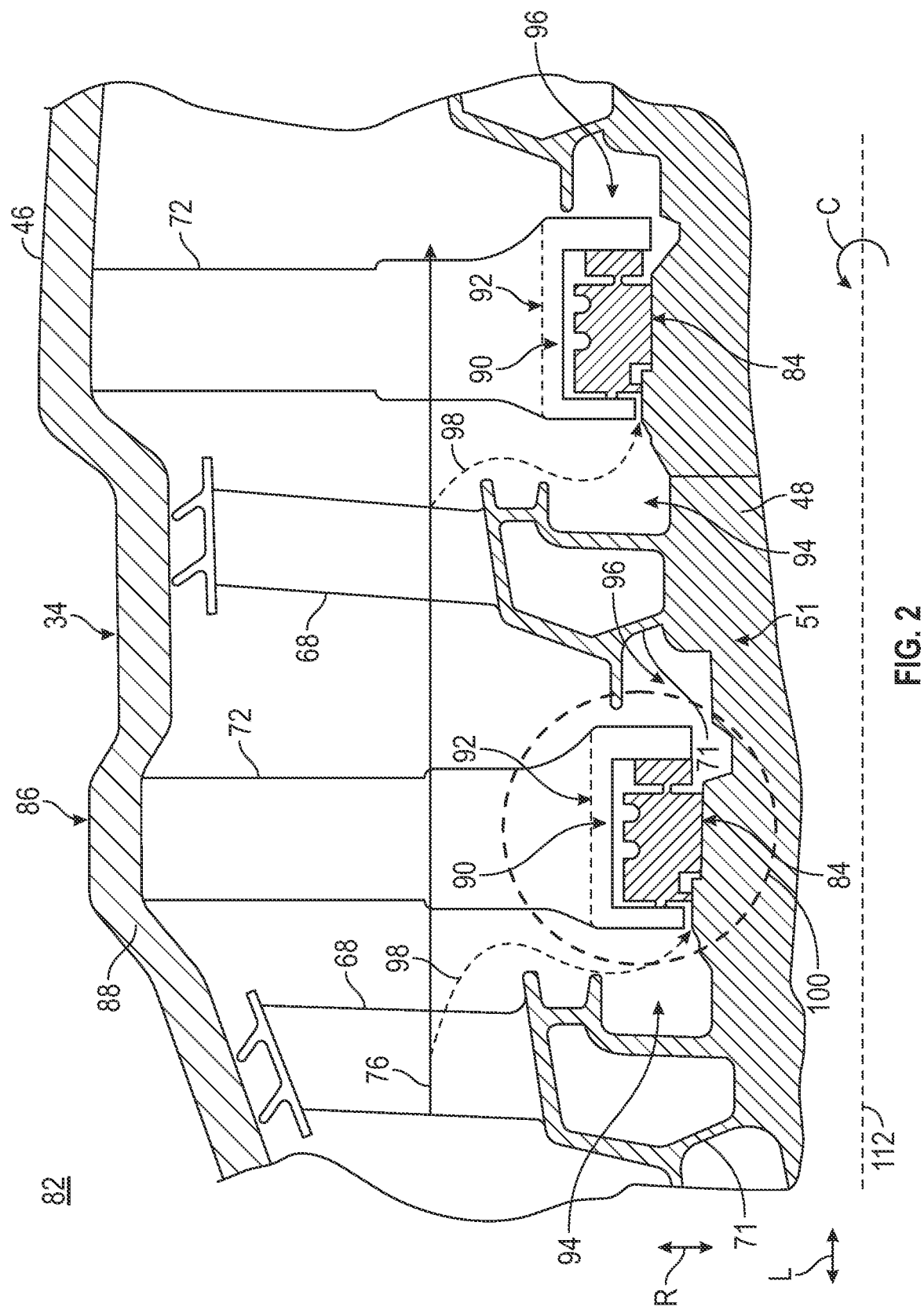
FIG. 2 is a partial cross-sectional view of a high pressure turbine section, taken at detail view 82 of FIG. 1, according to an aspect of the present disclosure.

FIG. 2 is a partial cross-sectional view of the high pressure turbine 34, taken at detail view 82 of FIG. 1, according to an aspect of the present disclosure. FIG. 2 further illustrates a portion of the rotor shaft assembly 51 that includes the HP shaft 48 and a plurality of the turbine rotors 71 having the HP turbine blades 68. The turbine rotors 71 are spaced apart in an axial direction (L) along the shaft centerline axis 112, and, as will be described in more detail below, a radial bearing engagement portion 84 is arranged between respective ones of the plurality of turbine rotors 71. As shown in FIG. 2, and as described above, the rotor shaft assembly 51 is encased or surrounded by the core casing 46. The core casing 46 in the HP turbine 34 may also be referred to as a stator housing assembly 86. The stator housing assembly 86 may include a stator housing 88 and the plurality of stator vanes 72 that extend inward (i.e., in a generally radial direction R with respect to the shaft centerline axis 112) from the stator housing 88. The plurality of stator vanes 72 may be fixed to the stator housing 88, such as by being welded to the stator housing 88. The stator housing assembly 86 further includes a plurality of seal assemblies 90 that are arranged at a radially inner end 92 of respective ones of the stator vanes 72 and are connected together circumferentially about the shaft centerline axis 112. The seal assemblies 90 will be described in more detail below, but briefly, the seal assemblies 90 provide a sealing function at the radial bearing engagement portion 84 for a leakage airflow 98 between a high pressure side 94 of the seal assembly 90 and a low pressure side 96 of the seal assembly 90. The leakage airflow 98 may be a part of the combustion gases 78 flowing through the HP turbine 34. As will further be described below, the seal assemblies 90 may also provide a radial bearing function (e.g., a hydrodynamic bearing) between the seal assembly 90 and the radial bearing engagement portion 84 of the HP shaft 48.

Figure 3:
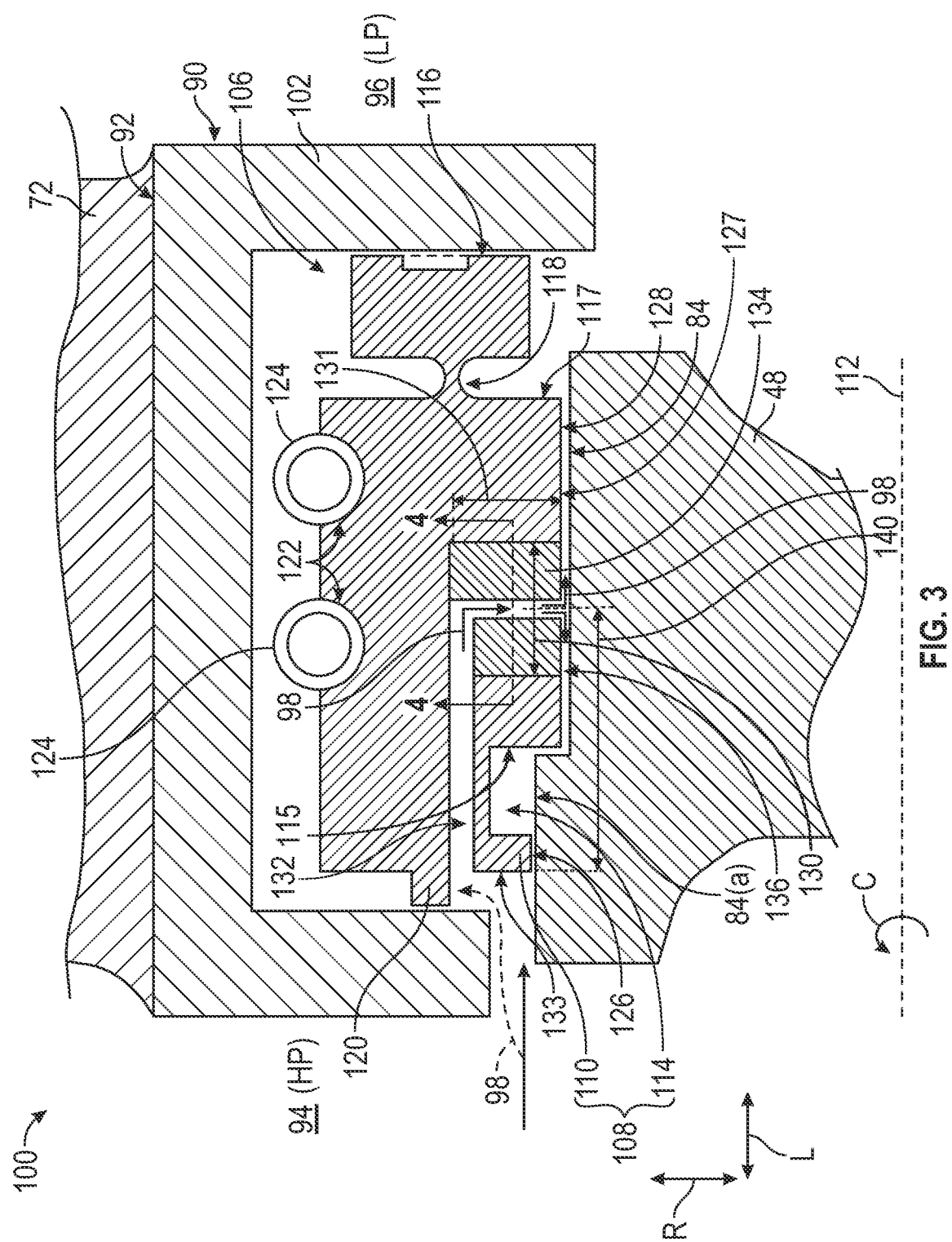
FIG. 3 is a partial cross-sectional view of a seal assembly, taken at detail view 100 of FIG. 2, according to an aspect of the present disclosure.

FIG. 3 is a partial cross-sectional view of a seal assembly 90, taken at detail view 100 of FIG. 2, according to an aspect of the present disclosure. The seal assembly 90 includes a seal case 102 that is connected with the stator vane 72. The seal case 102 may be a continuous case that extends circumferentially about the shaft centerline axis 112. Alternatively, the seal case 102 may constitute one of a plurality of seal cases 102 that are connected together to extend circumferentially about the shaft centerline axis 112. The seal case 102 defines a seal case cavity 106 in which a seal shoe 104 is floatingly arranged within the seal case 102. A seal face 116 and a pivot connection 118 are provided on a downstream (second) side 117 of the seal shoe 104 and are provided between the downstream side 117 of the seal shoe 104 and the seal case 102. A seal 120 is provided on the high pressure side 94 of the seal assembly 90 between the seal shoe 104 and the seal case 102. The seal 120 extends from a first (i.e., upstream) side 133 of the seal shoe 104 and can be configured to limit, to restrict, or otherwise to stop the ingress of the leakage airflow 98 from flowing between a portion of the seal shoe 104 and the seal case 102 and into the seal case cavity 106. For example, the seal 120 may sized/shaped to either allow a specified amount of leakage airflow 98 to pass therethrough between the seal shoe 104 and the seal case 102, or may be sized/shaped to so as to eliminate any of the leakage airflow 98 from passing therethrough into the seal case cavity 106.

The seal shoe 104 may further include grooves 122 that extend in a circumferential direction C with respect to the shaft centerline axis 112. As discussed above, a plurality of seal assemblies 90 may be connected circumferentially about the shaft centerline axis 112, and in this case, a plurality of seal shoes 104 are included for respective ones of the seal assemblies 90. Each seal shoe 104 generally extends in the circumferential direction C and includes the grooves 122, which also extend in the circumferential direction C. Retention mechanisms 124, such as by way of non-limiting example, a garter spring, may be provided within the grooves 122 to retain the seal shoes 104 in a rest condition (i.e., a non-operating state of the gas turbine engine). The retention mechanisms 124 may be a single continuous mechanism (e.g., spring) that extend circumferentially about the shaft centerline axis 112 so as to retain each of the seal shoes 104 in the rest condition. In addition, the seal shoe 104 may include a main seal portion 108 that is defined by a tooth 110 and a main seal cavity 114. The tooth 110 is part of the first side 133 of the seal shoe 104 and extends in the circumferential direction C. The main seal cavity 114 is formed on a downstream side of the tooth 110 and also extends in the circumferential direction C. The main seal portion 108 engages with a radial bearing engagement portion 84(*a*), which may be a stepped-up portion of the radial bearing engagement portion 84 of the HP shaft 48. In operation, a portion of the leakage airflow 98, from the high pressure side 94 of the seal assembly 90, may flow between a radially inner end 126 of the tooth 110 and the radial bearing engagement portion 84(*a*) of the HP shaft 48 and pressurize the main seal cavity 114. A pressure drop normally occurs across the tooth 110 such that the pressure within the main seal cavity 114 is lower than the high pressure side 94 of the seal case 102. The pressure within the main seal cavity 114, however, provides a sufficient seal of the leakage airflow 98. A depth in the radial direction R of the main seal cavity 114 and an axial length in the longitudinal direction L of the main seal cavity 114 can be arranged to provide a desired sealing effect to limit an amount of the leakage airflow 98 that can pass through the radially inner end 126 of the tooth 110.

The seal shoe 104 further includes a radial bearing surface 128 on a radially inner side 127 of the seal shoe 104 that extends from a downstream side 115 of the main seal cavity 114 to the downstream side 117 of the seal shoe 104, and extends in the circumferential direction C with respect to the shaft centerline axis 112. The radial bearing surface 128 engages with the radial bearing engagement portion 84 of the HP shaft 48. In some aspects, as will be described below, the radial bearing surface 128 may be coated with an abradable wear coating. The seal shoe 104 may also include one or more hydrodynamic lift cavities 130 extending through the radial bearing surface 128 and extending radially outward from radial bearing surface 128 a depth 131. As will be described in more detail below, the hydrodynamic lift cavities 130 can be filled with a filament element 134. One or more airflow passages 132 can extend from a first side 133 of the seal shoe 104, through the filament element 134 in the hydrodynamic lift cavities 130 and through the radial bearing surface 128. The airflow passage 132 provides airflow communication between the first side 133 of the seal shoe 104 and the one or more hydrodynamic lift cavities 130. The first side 133 may be on the high pressure side 94 of the seal assembly 90, while the downstream side 117 of the seal shoe 104 may be on the low pressure side 96 of the seal assembly 90. As a result, in operation of the gas turbine engine 10, the leakage airflow 98 can flow through the airflow passage 132, through the filament element 134 of the hydrodynamic lift cavity 130 to impinge against the radial bearing engagement portion 84 of the HP shaft 48. The leakage airflow 98 can provide a hydrodynamic lift/bearing between the radial bearing surface 128 of the seal shoe 104 and the radial bearing engagement portion 84 of the HP shaft 48, thereby creating a gap 136 between the radial bearing surface 128 and the radial bearing engagement portion 84 through which the leakage airflow 98 can pass.

In the FIG. 3 aspect, the filament element 134 may be included in the one or more hydrodynamic lift cavities 130. The filament element 134 may be a single continuous filament element that fills the entirety of a width of the hydrodynamic lift cavity and that extends from the radial bearing surface 128 the full depth 131 of the hydrodynamic lift cavity 130. A portion of the filament element 134 may be removed to form the airflow passage 132 therethrough. Thus, the airflow passage 132 extends through the filament element 134. In one aspect, the filament element 134 may be an abradable high porosity filler element having either an open cell structure or having a closed cell structure. In another aspect, the filament element 134 may be an abradable fiber metal structure element, such as a metal felt material (e.g., a porous material made of sintered metal fibers or a metal sponge), or a high temperature non-metallic felt material (e.g., a basalt needled felt material). During operation of the gas turbine engine 10, and, more specifically, during start-up or during certain operating states of the gas turbine engine 10, the radial bearing surface 128 of the seal shoe 104 and the radial bearing engagement portion 84 of the HP shaft 48 may contact each other (i.e., rub against one another) while the HP shaft 48 is rotating. As a result, the radial bearing surface 128 of the seal shoe 104 may wear down, resulting in a the gap 136 between the radial bearing surface 128 and the radial bearing engagement portion 84 becoming larger. When the gap 136 becomes larger, a diminished hydrodynamic bearing lift effect between the radial bearing surface 128 and the radial bearing engagement portion 84 may occur. By providing the at least one hydrodynamic lift cavity 130 with the filament element 134, the leakage airflow 98 flowing through the at least one airflow passage 132 and into the gap 136 fills the pores in the filament element 134 to provide an increased hydrodynamic bearing lift effect. As the filament element 134 wears down, additional pores are exposed, and, as a result, the filament element 134 can continue to provide the increased hydrodynamic lift effect.

FIG. 4A is a partial flattened circumferential cross-sectional view of the one or more hydrodynamic lift cavities 130, taken at circumferentially extending cut-plane 4-4 of FIG. 3, according to an aspect of the present disclosure. The FIG. 4A view is a flattened view of the circumferential cut-plane 4-4 taken at a constant axial width in the longitudinal direction L about the shaft centerline axis 112. As shown in FIG. 4A, a plurality of hydrodynamic lift cavities 130 may be provided in the circumferential direction C in the seal shoe 104. That is, in FIG. 3, one hydrodynamic lift cavity 130 is shown, but a plurality of hydrodynamic lift cavities 130 may be provided in the seal shoe 104 instead. In the non-limiting example of FIG. 4A, the plurality of hydrodynamic lift cavities 130 may be a circular-shaped hydrodynamic lift cavity 141 and have a diameter 135. The diameter 135 is used to define a cross-sectional area A1 (where A1=$\pi(d/2)^2$; d=diameter) of the hydrodynamic lift cavity 130 (i.e., the circular-shaped hydrodynamic lift cavity 141), and the area A1 may be designed so as to provide a desired amount of hydrodynamic lift to the seal shoe 104. The area A1 may be determined based on the number and size of the pores in the filament element 134 so that the area A1 is sufficient, based on the porosity of the filament element 134, to provide sufficient hydrodynamic lift. Alternatively, the hydrodynamic lift cavities 130 may have other shapes, including being oval shaped rather than circular shaped, and the cross-sectional area A2 (where A2=$\pi(a)(b)$; a=oval major radius and b=oval minor radius) of the oval shaped hydrodynamic lift cavity may also be designed to provide the desired amount of hydrodynamic lift to the seal shoe 104 at various operating conditions of the gas turbine engine 10.

The plurality of hydrodynamic lift cavities 130 may be arranged an axial distance 140 (see also, FIG. 3) in a downstream direction from the first side 133, and may be circumferentially spaced apart a circumferential distance 142. In FIG. 4A, each of the plurality of hydrodynamic lift cavities 130 are shown as being arranged along a same axial line 138 extending in the circumferential direction C so as to have the same axial distance 140 from the first side 133. However, as shown in FIG. 4D, the plurality of hydrodynamic lift cavities 130 may be axially offset from one another so that each one of the hydrodynamic lift cavities 130 may be located at a different axial distance 140 so as to be axially staggered. As shown in FIG. 4D, a first hydrodynamic lift cavity 130 and a second hydrodynamic lift cavity 130" may be arranged at the axial distance 140 from the first side 133, while a third hydrodynamic lift cavity 130' may be arranged at an axial distance 140' from the first side 133. In addition, each of the plurality of hydrodynamic lift cavities 130 may have a varying circumferential distance 142 with respect to others of the plurality of hydrodynamic lift cavities 130, and the circumferential distance 142 need not be the same for all of the hydrodynamic lift cavities 130 such that the hydrodynamic lift cavities 130 may be circumferentially staggered. For example, as shown in FIG. 4D, the first hydrodynamic lift cavity 130 and the third hydrodynamic lift cavity 130' may be circumferentially spaced apart by the circumferential distance 142, while the second hydrodynamic lift cavity 130" may be arranged circumferentially at a distance 142' from the third hydrodynamic lift cavity 130'.

Referring back to FIG. 3, the hydrodynamic lift cavity 130 may have the depth 131 with respect to the radial bearing surface 128. The filament element 134 is arranged so as to fill the hydrodynamic lift cavity 130, but includes a cut-out portion to form the airflow passage 132 therethrough to allow the leakage airflow 98 to pass therethrough. The depth 131 may be the same for respective ones of the plurality of hydrodynamic lift cavities 130, or the depth 131 may be different for respective ones of the plurality of hydrodynamic lift cavities 130.

FIG. 4B depicts a partial flattened circumferential cross-sectional view of an alternate arrangement of the hydrodynamic lift cavities 130 to that shown in FIG. 4A. In FIG. 4B, a plurality of hydrodynamic lift cavities 130($a$) are shown as being a rectangular-shaped cavity 143 having a square shape or a rectangular shape rather than being the circular-shaped hydrodynamic lift cavities 141 of FIG. 4A. Thus, the hydrodynamic lift cavities 130($a$) may have a first length 137 and a second length 139, where a product of the first length 137 and the second length 139 defines a cross-sectional area A3 of the hydrodynamic lift cavity 130($a$) (i.e., the area A3 of the rectangular-shaped cavity 143). The cross-sectional area A3 may, similar to the FIG. 4A aspect, be designed to provide a desired amount of hydrodynamic lift to the seal shoe 104 at various operating conditions of the gas turbine engine 10. The first length 137 and the second length 139 may be the same length so as to define a square shaped cavity. Alternatively, the first length 137 and the second length 139 may be different from one another so as to define a rectangular shaped cavity. Similar to the FIG. 4A aspect, the plurality of hydrodynamic lift cavities 130($a$) may be arranged at the axial distance 140 from the first side 133 of the seal shoe, and may be spaced apart circumferentially the circumferential distance 142.

Figure 4C:
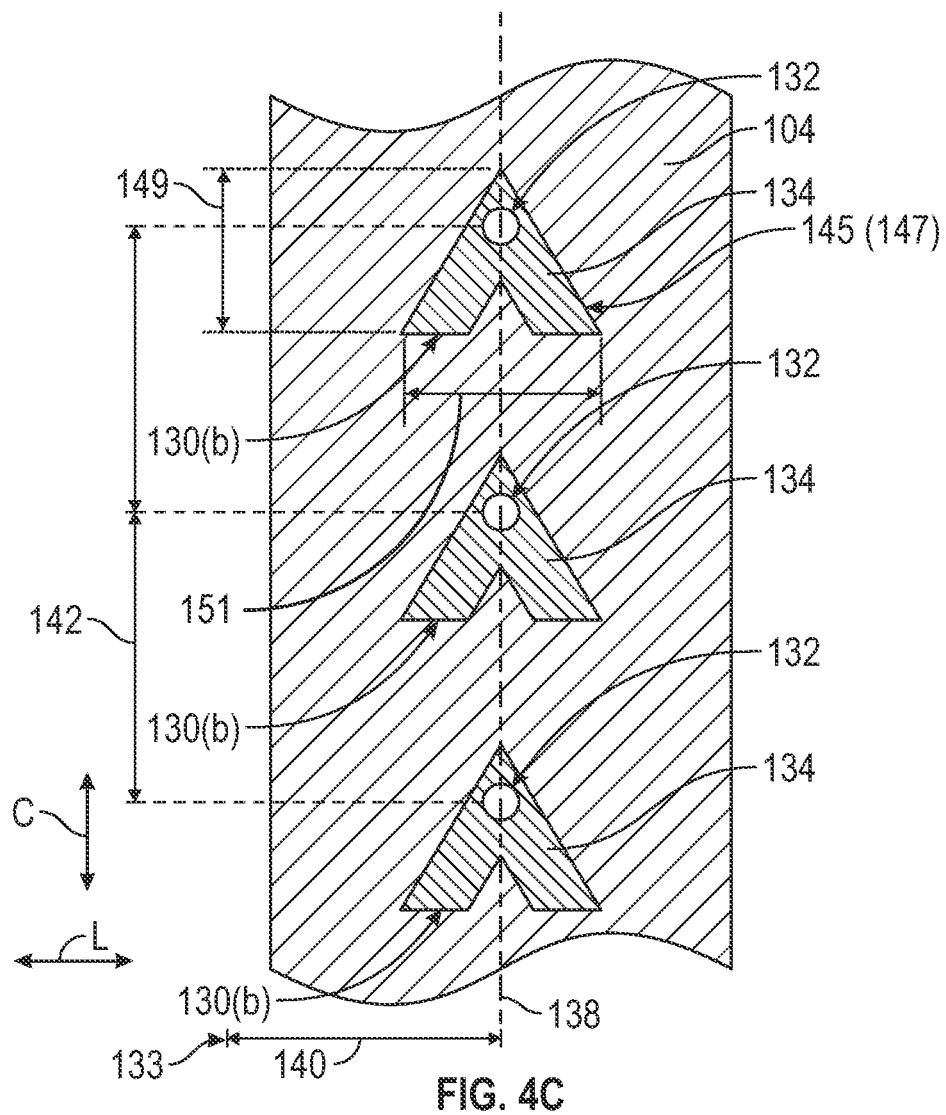
FIG. 4C depicts a flattened circumferential partial-cross sectional view of an alternate arrangement of the hydrodynamic lift cavities to that shown in FIG. 4A, according to an aspect of the present disclosure.

FIG. 4C depicts a partial flattened circumferential cross-sectional view of another alternate arrangement of the hydrodynamic lift cavities 130 to that shown in FIG. 4A. In FIG. 4C, a plurality of hydrodynamic lift cavities 130(b) are shown as being triangular shaped cavities 145 having a triangular or chevron shape 147 rather than being the circular-shaped hydrodynamic lift cavities 141. The hydrodynamic lift cavities 130(b) may have a cross-sectional area A3 defined by a size of the triangle(s) forming the hydrodynamic lift cavities 130(b). For example, the cross-sectional area A3 of the triangular shaped cavities 145 may be defined by A3=½(h) (w), where h=the height 149 and w=width 151. Similar to the FIG. 4A aspect, the cross-sectional area A3 may be designed to provide a desired amount of hydrodynamic lift to the seal shoe 104 at various operating conditions of the gas turbine engine 10.

Figure 4E:
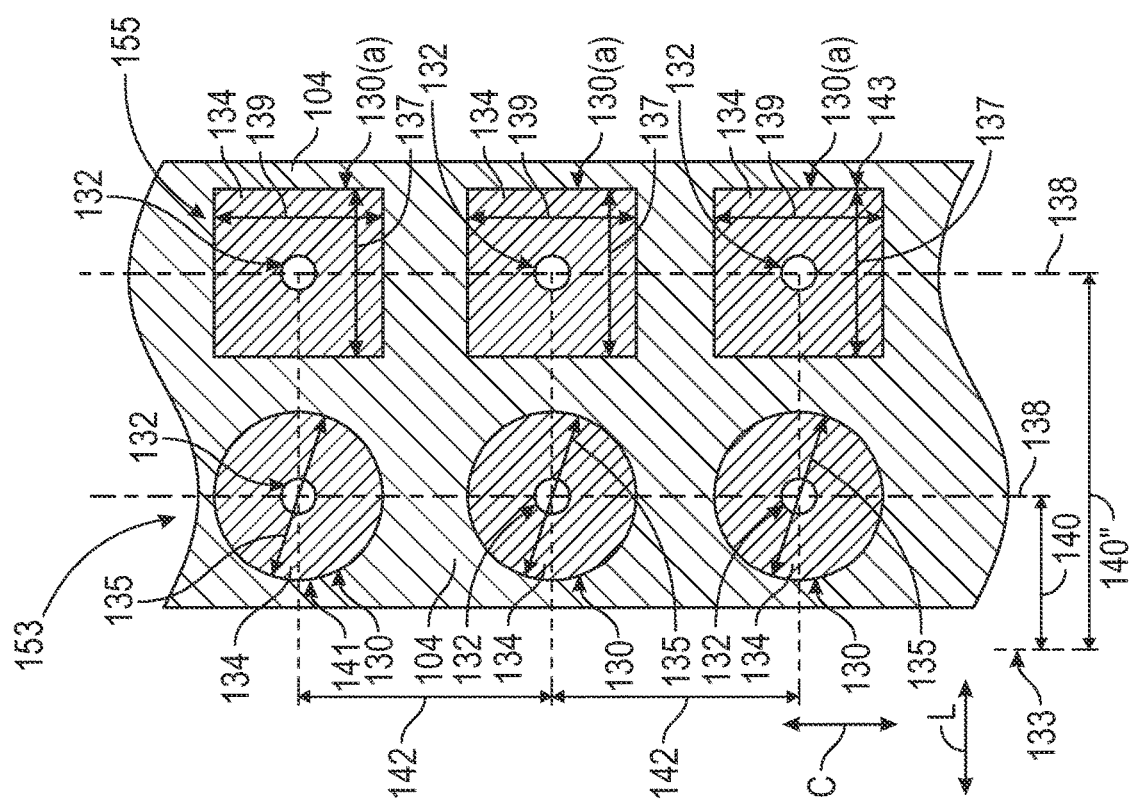
FIG. 4E depicts a flattened circumferential partial-cross sectional view of an alternate arrangement of the hydrodynamic lift cavities to that shown in FIG. 4A, according to an aspect of the present disclosure.
Figure 4D:
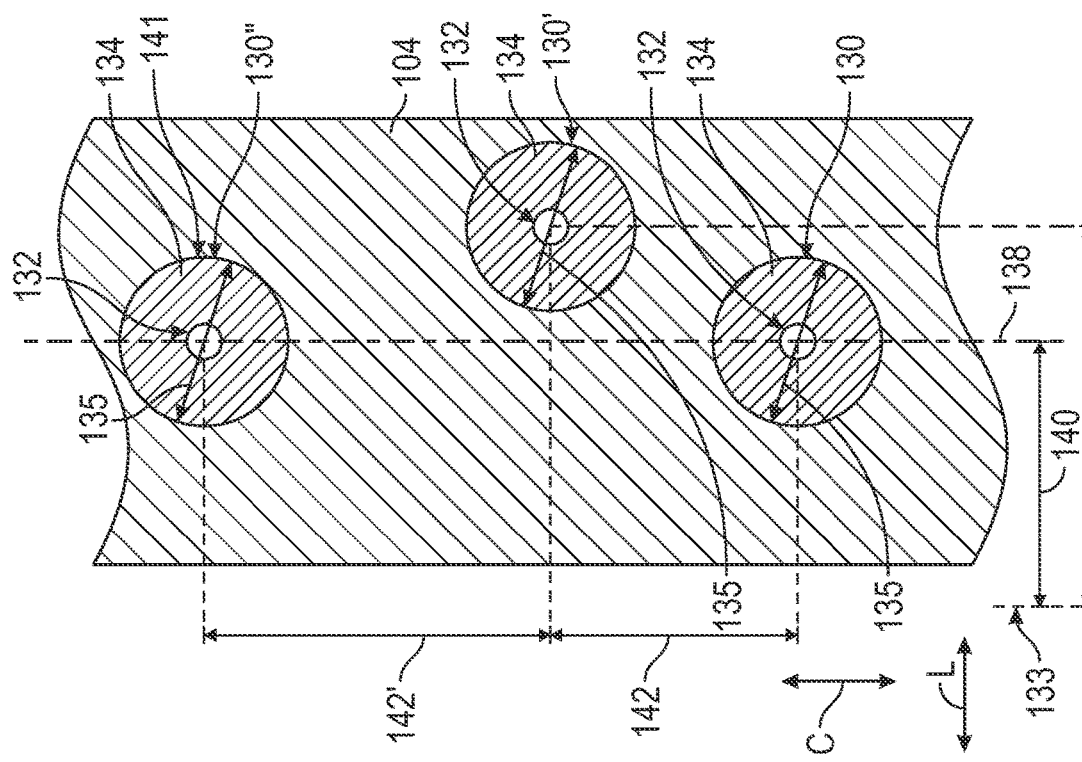
FIG. 4D depicts a flattened circumferential partial-cross sectional view of an alternate arrangement of the hydrodynamic lift cavities to that shown in FIG. 4A, according to an aspect of the present disclosure.

FIG. 4E is a partial flattened circumferential cross-sectional view of another alternate arrangement of the hydrodynamic lift cavities 130 to that shown in FIG. 4A. While FIGS. 4A to 4C depict a single circumferential row of the hydrodynamic lift cavities 130 arranged at a same axial distance 140 from the first side 133, the seal shoe 104 may instead include multiple circumferential rows of hydrodynamic lift cavities 130. As shown in FIG. 4E, a first circumferential row 153 may include the circular shaped hydrodynamic lift cavities 130 arranged at the axial distance 140 from the first side 133, and a second circumferential row 155 of the rectangular-shaped hydrodynamic lift cavities 143 arranged at an axial distance 140". Of course, the multiple rows of hydrodynamic lift cavities 130 could have the same shape (e.g., multiple rows of circular shaped hydrodynamic lift cavities 130) instead of having different shapes. Additionally, while the circumferential distance 142 between the hydrodynamic lift cavities within the first circumferential row 153 and the circumferential distance 142 between the rectangular-shaped hydrodynamic lift cavities 143 of the second circumferential row 155 may also be different. Further, the hydrodynamic lift cavities 130 of the first circumferential row 153 may be circumferentially offset from the rectangular-shaped hydrodynamic lift cavities 143 of the second circumferential row 155. Any other combination of the number of circumferential rows, the shapes of the hydrodynamic lift cavities, the axial distance of the circumferential rows, and the circumferential spacing of the hydrodynamic lift cavities within a circumferential row may also be implemented.

Figure 5:
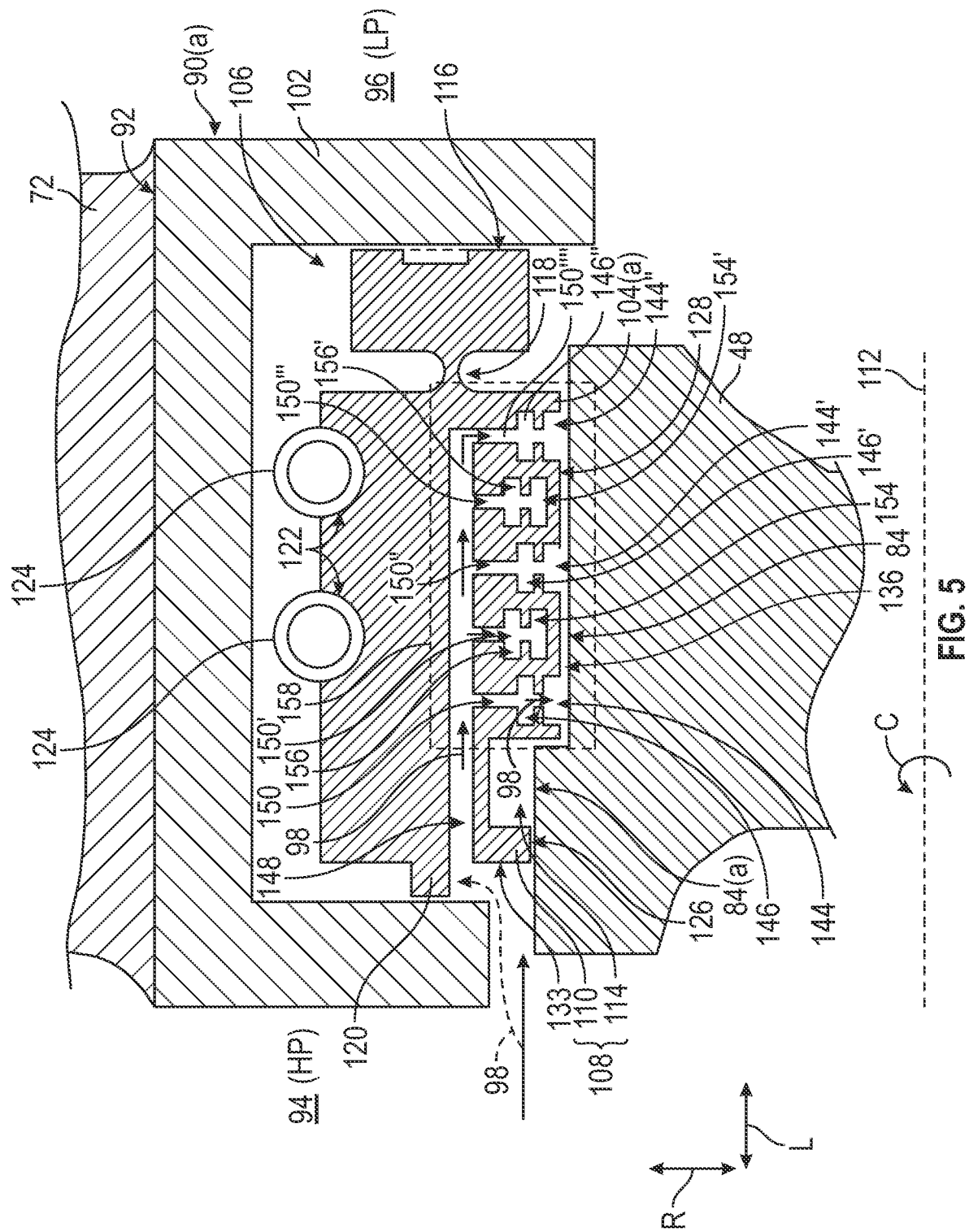
FIG. 5 depicts a partial cross-sectional view of an alternate arrangement to that shown in FIG. 3 of a seal assembly 90(*a*), according to another aspect of the present disclosure.

FIG. 5 depicts an alternate arrangement to that shown in FIG. 3 of a seal assembly 90(a), according to another aspect of the present disclosure. In the FIG. 5 aspect, elements that are the same as those depicted in FIG. 3 include the same reference numerals. The FIG. 5 aspect includes an alternate arrangement of a seal shoe 104(a), as compared to the seal shoe 104 of FIG. 3. The seal shoe 104(a) includes a first plurality of hydrodynamic lift cavities that includes at least one open hydrodynamic lift cavity 144, at least one open hydrodynamic lift cavity 144', and at least one open hydrodynamic lift cavity 144', each of which extends through the radial bearing surface 128. The term "open" is intended to mean that one side (e.g., an inner side) of the hydrodynamic lift cavity is open through the radial bearing surface 128. The at least one open hydrodynamic lift cavity 144, the at least one open hydrodynamic lift cavity 144', and the at least one open hydrodynamic lift cavity 144" arranged axially offset from one another in the axial direction (L) with respect to the shaft centerline axis 112. Each of the open hydrodynamic lift cavities 144, 144' and 144" extend radially outward from (i.e., in the radial direction R) and extend through the radial bearing surface 128.

The seal shoe 104(a) of FIG. 5 includes an airflow passage 148. A plurality of branched airflow passages 150, 150", and 150" branch off of the airflow passage 148 and provide airflow communication from the airflow passage 148 to a respective one of the open hydrodynamic lift cavities 144, 144', and 144". The first plurality of open hydrodynamic lift cavities 144 may include a plurality of the open hydrodynamic lift cavities 144 (one shown in FIG. 5) that are circumferentially spaced apart similar to the hydrodynamic lift cavities 130 of FIG. 4A, and may be shaped in a similar manner to those shown in FIGS. 4A to 4C. A similar circumferential arrangement of a plurality of the open hydrodynamic lift cavities 144' and the open hydrodynamic lift cavities 144" may also be included in the seal shoe 104(a). Thus, each of the open hydrodynamic lift cavities 144, 144', and 144" can provide a hydrodynamic lift effect between the radial bearing surface 128 of the seal shoe 104(a) and the radial bearing engagement portion 84 of the HP shaft 48 by virtue of the leakage airflow 98 flowing through the airflow passage 148 and the branched airflow passages 150, 150", and 150" into the open hydrodynamic lift cavity 144, 144', and 144", respectively.

Referring still to FIG. 5, the seal shoe 104(a) includes a second plurality of closed hydrodynamic lift cavities 146, where respective ones of the second plurality of closed hydrodynamic lift cavities 146, 146', and 146" that are arranged radially outward of respective ones of the first plurality of open hydrodynamic lift cavities 144, 144', and 144". The term "closed" is intended to mean that the hydrodynamic lift cavity is contained within the seal shoe such that a radially inner side of the closed hydrodynamic lift cavity is not open through the radial bearing surface 128. The branched airflow passages 150, 150", and 150" however, extend through the closed hydrodynamic lift cavities 146, 146', and 146", respectively. Such an arrangement of the first plurality of open hydrodynamic lift cavities 144, 144', and 144", and the second plurality of closed hydrodynamic lift cavities 146, 146', and 146", along with the branched airflow passages 150, 150", and 150" may be manufactured, for example, via an additive manufacturing process. Similar to the first plurality of open hydrodynamic lift cavities 144, 144', and 144", the second plurality of closed hydrodynamic lift cavities 146, 146', and 146" may also be spaced apart from each other in the circumferential direction (C), and may have any of the shapes, as described above with regard to FIGS. 4A to 4C.

Referring still to FIG. 5, the seal shoe 104(a) may further include a third plurality of closed hydrodynamic lift cavities 154, 154' that are axially arranged between respective ones of the open hydrodynamic lift cavities 144, 144', and 144", and that are arranged radially outward from the radial bearing surface 128. The seal shoe 104(a) may also include a fourth plurality of closed hydrodynamic lift cavities 156 and 156' that are arranged radially outward of the third plurality of hydrodynamic lift cavities 154 and 154', respectively. Any one or more, or all of, the closed hydrodynamic lift cavities 154 and 154', and the closed hydrodynamic lift cavities 156 and 156' may also be spaced apart circumferentially as shown in FIGS. 4A to 4C, and may have any of the shapes as also shown in FIGS. 4A to 4C.

Figure 6A:
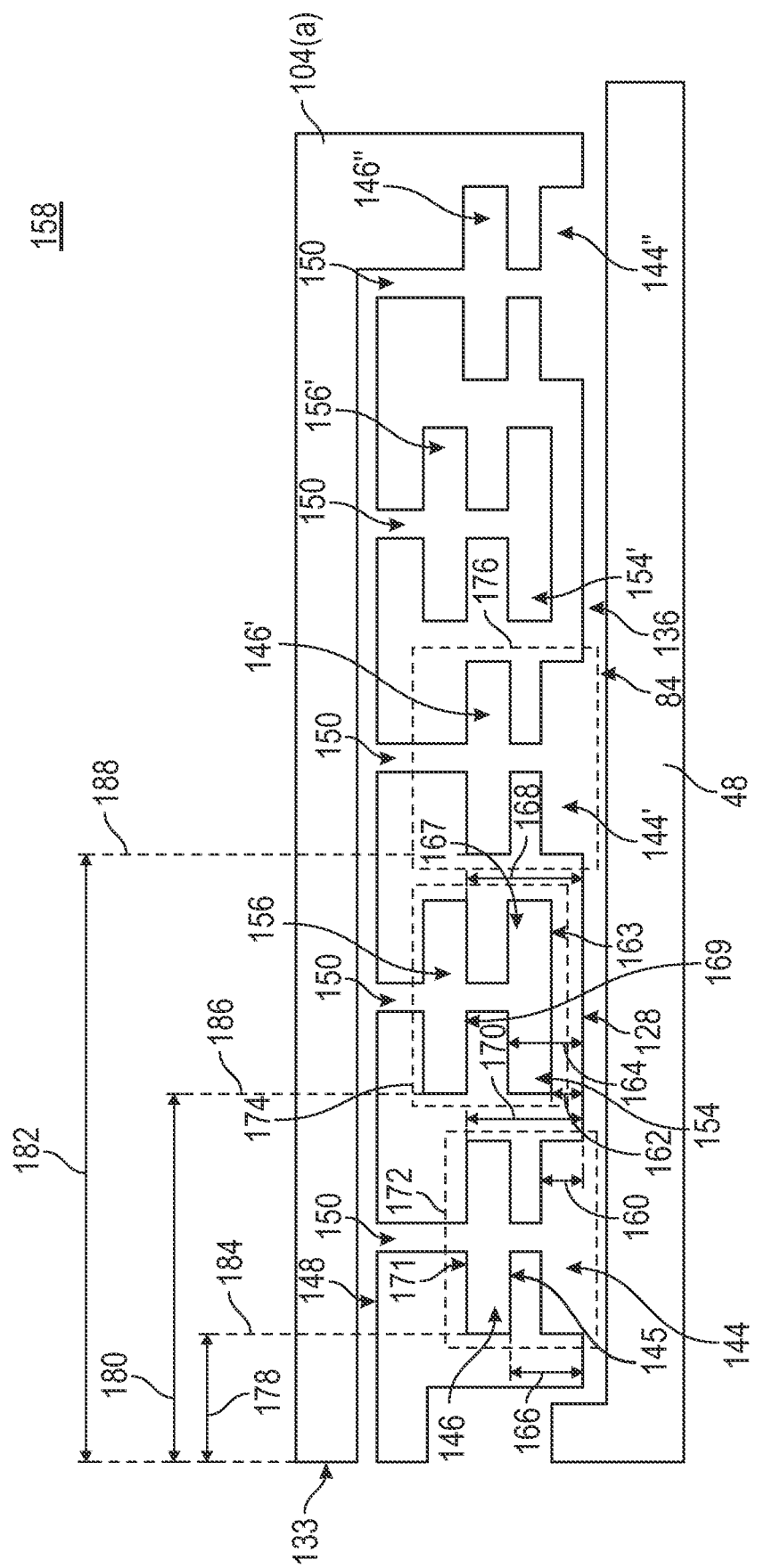
FIG. 6A is an enlarged view of the hydrodynamic lift cavities depicted in FIG. 5, taken at detail view 158 of FIG. 5, according to an aspect of the present disclosure.

FIG. 6A is an enlarged view of the hydrodynamic lift cavities depicted in FIG. 5, taken at detail view 158 of FIG. 5, according to an aspect of the present disclosure. In FIG. 6A, cross-hatching of the cross-sectional area has been removed merely for clarity. In the FIG. 6A aspect, the plurality of hydrodynamic lift cavities discussed above for FIG. 5 may be arranged in a plurality of groups of hydrodynamic lift cavities. In particular, a first group 172 of hydrodynamic lift cavities, which is axially located closest to the first side 133, may include an open hydrodynamic lift cavity 144 and a closed hydrodynamic lift cavity 146 arranged radially outward of the open hydrodynamic lift cavity 144. The first group 172 of hydrodynamic lift cavities may be arranged at a first axial distance 178 from the first side 133 of the seal shoe 104(*a*), where the first axial distance 178 may be taken at a reference line 184 at an upstream side of the open hydrodynamic lift cavity 144 of the first group 172. A second group 174 of hydrodynamic lift cavities may include a closed hydrodynamic lift cavity 154 and a closed hydrodynamic lift cavity 156 that is arranged radially outward of the closed hydrodynamic lift cavity 154. The second group 174 may be arranged at a second axial distance 180 greater than the first axial distance 178 from the first side 133 of the seal shoe 104(*a*), where the second axial distance 180 may be taken at a reference line 186 at an upstream side of the closed hydrodynamic lift cavity 154 of the second group 174. In the second group 174, both the closed hydrodynamic lift cavity 154 and the closed hydrodynamic lift cavity 156 are radially shifted outward in comparison to the open hydrodynamic lift cavity 144 and the closed hydrodynamic lift cavity 146 of the first group 172.

Similar to the first group 172, a third group 176 of hydrodynamic lift cavities may include an open hydrodynamic lift cavity 144' and a closed hydrodynamic lift cavity 146'. The third group 176 may be arranged at a third axial distance 182 greater than the second axial distance 180 from the first side 133 of the seal shoe 104(*a*), where the third axial distance 182 may be taken at a reference line 188 at an upstream side of the hydrodynamic lift cavity 144' of the third group 176. Additional groups of hydrodynamic lift cavities may also be included in the seal shoe 104(*a*), including a fourth group (not labeled) similar to the second group 174 that includes a closed hydrodynamic lift cavity 154' and a closed hydrodynamic lift cavity 156', and that is located axially downstream of the third group 176, and a fifth group (not labeled) similar to the first group 172 and similar to the third group 176 that includes an open hydrodynamic lift cavity 144" and a closed hydrodynamic lift cavity 146", and that is located axially downstream of the fourth group.

Figure 6B:
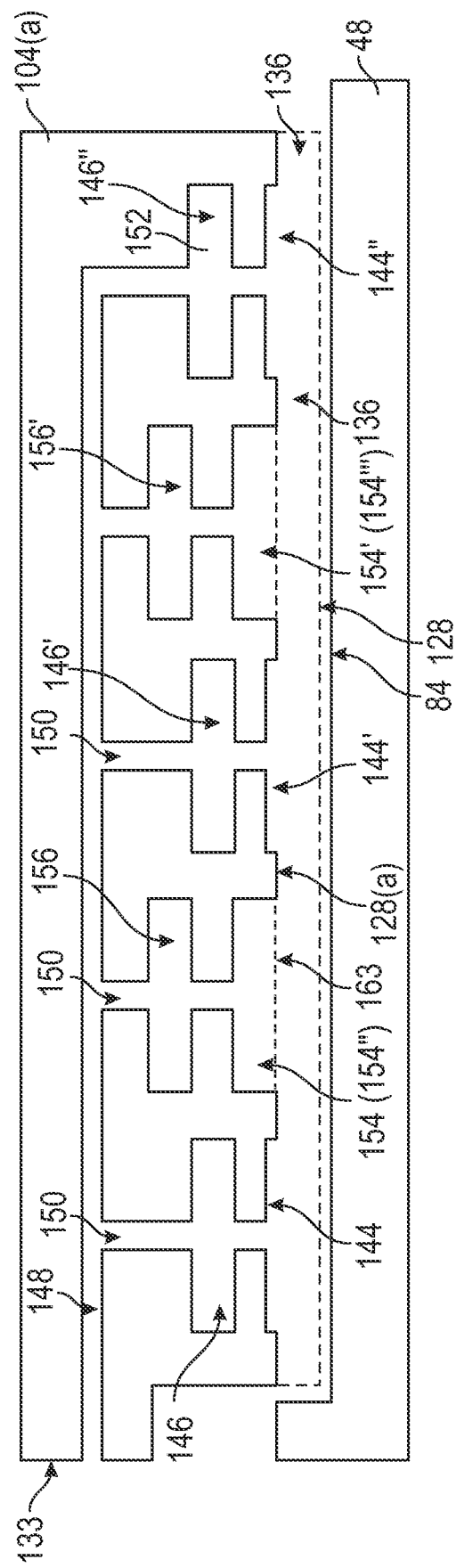
FIG. 6B depicts the enlarged view of FIG. 6A after a wear down of the seal shoe caused by operating the gas turbine engine, according to an aspect of the present disclosure.

The arrangement of FIG. 6A may be a case when the seal shoe 104(*a*) is in a new state (i.e., newly manufactured). FIG. 6B is the enlarged view similar to FIG. 6A after a wear down state of the radial bearing surface 128 caused by operating the gas turbine engine, according to an aspect of the present disclosure. The wear down state means a state of the seal shoe 104(*a*) after the seal shoe 104(*a*) has been placed in service and wear of the seal shoe 104(*a*) has occurred due to rubbing between the radial bearing surface 128 of the seal shoe 104(*a*) and the radial bearing engagement portion 84 of the HP shaft 48. As shown in FIG. 6A, in a new state, each of the first plurality of open hydrodynamic lift cavities 144, 144', and 144" may have a depth 160 taken from the radial bearing surface 128. In addition, a radially inner end 163 of each of the closed hydrodynamic lift cavities 154 and 154' may be arranged at a distance 162 from the radial bearing surface 128. The distance 162 to the radially inner end 163 of the closed hydrodynamic lift cavities 154 and 154' may be less than the depth 160 of the open hydrodynamic lift cavities 144, 144', and 144".

Referring to FIG. 6B, depicted is an arrangement of the open hydrodynamic lift cavities 144, 144', and 144" and the closed hydrodynamic lift cavities 154 and 154' after the wear down condition in which at least a portion of the radial bearing surface 128 (shown in dashed lines for the new state) has been worn down to be a radial bearing surface 128(*a*) due to operating of the gas turbine engine 10. While the radial bearing surface 128(*a*) is shown in FIG. 6B to be spaced further apart from the radial bearing engagement portion 84 than the radial bearing surface 128, this is merely for illustration purposes. In operation, while the wear down state is occurring, the retention mechanisms 124 (FIG. 5) apply radially inward pressure against the seal shoe 104(*a*) so as to substantially maintain the spacing (i.e., the gap 136) between the radial bearing surface 128(*a*) and the radial bearing engagement portion 84 as in the new state. As seen in FIG. 6B, when the radial bearing surface 128 wears down to be even with the radially inner end 163 of the closed hydrodynamic lift cavities 154 and 154', the closed hydrodynamic lift cavities 154 and 154' become open hydrodynamic lift cavities 154' and 154", respectively (similar to the open hydrodynamic lift cavities 144, 144' and 144") and may provide additional hydrodynamic lift between the radial bearing surface 128(*a*) and the radial bearing engagement portion 84 of the HP shaft 48 to maintain the gap 136.

To obtain the same effect with the remaining hydrodynamic lift cavities, a distance 166 to a radially inner end 165 of the closed hydrodynamic lift cavities 146, 146' and 146" may be less than a distance 164 to a radially outer end 167 of the closed hydrodynamic lift cavities 154 and 154'. Thus, when the radial bearing surface 128(*a*) wears down to the radially inner end 165 of the closed hydrodynamic lift cavities 146, 146' and 146", the closed hydrodynamic lift cavities 146, 146' and 146" become open hydrodynamic lift cavities (not shown, but similar to the open hydrodynamic lift cavities 154" and 154") and can provide additional hydrodynamic lift.

Still further, to obtain the same effect with the remaining hydrodynamic lift cavities, a distance 168 to a radially inner end 169 of the closed hydrodynamic lift cavities 156 and 156' may be less than a distance 170 to a radially outer end 171 of the closed hydrodynamic lift cavities 146, 146' and 146". Thus, when the radial bearing surface 128(*a*) wears down to the radially inner end 169 of the closed hydrodynamic lift cavities 156 and 156', the closed hydrodynamic lift cavities 156 and 156' become open hydrodynamic lift cavities (not shown, but similar to the open hydrodynamic lift cavities 154" and 154") and can provide additional hydrodynamic lift.

FIG. 7 depicts a partial cross-sectional view of an alternate arrangement to that shown in FIG. 3 of a seal assembly 90(*b*), according to another aspect of the present disclosure. In the FIG. 7 aspect, elements that are the same as those depicted in FIG. 3 include the same reference numerals. The FIG. 7 aspect, however, includes an alternate arrangement of a seal shoe 104(*b*), as compared to the seal shoe 104 of FIG. 3. The seal shoe 104(*b*) includes a first group 198 of hydrodynamic lift cavities that includes an open hydrodynamic lift cavity 192, which may be similar to the open hydrodynamic lift cavity 144 (FIG. 5), and a closed hydrodynamic lift cavity 194, which may be similar to the closed hydrodynamic lift cavity 146 (FIG. 5). A second group 200 of hydrodynamic lift cavities is arranged axially downstream from the first group 198 of hydrodynamic lift cavities and also includes an open hydrodynamic lift cavity 192' and a closed hydrodynamic lift cavity 194'. A plurality of the open hydrodynamic lift cavities 192 and 192', and a plurality of the closed hydrodynamic lift cavities 194 and 194' may be provided in the seal shoe 104(*b*), and may have any shape or circumferential spacing of the hydrodynamic lift cavities shown in the aspects of FIGS. 4A to 4D, without the filament element 134. Each of the first group 198 of the hydrodynamic lift cavities and the second group 200 of the hydrodynamic lift cavities may be considered as a multi-wear sleeve that, as the radial bearing surface 128 wears down, the closed hydrodynamic lift cavities 194 and 194' are exposed to become open hydrodynamic lift cavities (not shown), similar to the open hydrodynamic lift cavities 154" and 154"' (FIG. 6B). The seal shoe 104(*b*) of FIG. 7 also includes an abradable coating 190, which may be a wear coating. The abradable coating 190 may surround the first group 198 of hydrodynamic lift cavities and may surround the second group 200 of hydrodynamic lift cavities. Similar to the FIG. 5 aspect, an airflow passage 196 is included in the seal shoe 104(*b*) and a plurality of branched airflow passages 197 and 197' provide airflow communication from the airflow passage 196 to the open hydrodynamic lift cavities 192 and 192', respectively. Thus, the FIG. 7 aspect provides both the hydrodynamic lift cavities to provide additional hydrodynamic lift, and the abradable coating to provide a more even wear and better wear resistance to the radial bearing surface 128.

FIG. 8 depicts a partial cross-sectional view of an alternate arrangement to that shown in FIG. 3 of a seal assembly 90(*c*), according to another aspect of the present disclosure. In the FIG. 8 aspect, elements that are the same as those depicted in FIG. 3 include the same reference numerals. The FIG. 8 aspect, however, includes an alternate arrangement of a seal shoe 104(*c*), as compared to the seal shoe 104 of FIG. 3. The seal shoe 104(*c*) includes at least one first open hydrodynamic lift cavity 202, and at least one second open hydrodynamic lift cavity 204 arranged axially downstream of the first open hydrodynamic lift cavity 202. A plurality of the first open hydrodynamic lift cavities 202 and a plurality of the second open hydrodynamic lift cavities 204 may be provided in the seal shoe 104(*c*), and may have any shape or circumferential spacing of the hydrodynamic lift cavities shown in the aspects of FIGS. 4A to 4D, without the filament element 134. An airflow passage 206 has a first branched airflow passage 208 that feeds the leakage airflow 98 to the first open hydrodynamic lift cavity 202, and has a second branched airflow passage 210 that feeds the leakage airflow 98 to the second open hydrodynamic lift cavity 204. The airflow passage 206 also includes a first secondary airflow passage 212, a second secondary airflow passage 214, and a third secondary airflow passage 216. Each of the first secondary airflow passage 212, the second secondary airflow passage 214, and the third secondary airflow passage 216 are blocked at an outlet end by an abradable wear cap 218 formed in, or installed in the seal shoe 104(*c*). With the abradable wear caps 218, once the radial bearing surface 128 wears down through the abradable wear caps 218 to expose each of the first secondary airflow passage 212, the second secondary airflow passage 214, and the third secondary airflow passage 216, each of the first secondary airflow passage 212, the second secondary airflow passage 214, and the third secondary airflow passage 216 can provide additional airflow to the gap 136 so as to provide additional hydrodynamic lift to the seal shoe 104(*c*).

While each of the foregoing aspects of FIG. 2 through FIG. 8 is described with regard to a seal assembly in the HP turbine section 34, the seal assemblies described herein may be implemented in other portions of the gas turbine engine 10. For example, the seal assemblies of FIG. 2 through FIG. 8 may be implemented in the LP turbine 36, the LP compressor 24, or the HP compressor 26.

With each of the foregoing aspects of FIG. 2 through FIG. 8, when the seal shoe 104 wears down due to making contact between the radial bearing surface 128 and the radial bearing engagement portion 84 of the HP shaft 48, additional hydrodynamic lift can be provided by opening additional hydrodynamic lift cavities, airflow passages, or a combination thereof so as to provide additional airflow to the gap 136 between the radial bearing surface 128 and the radial bearing engagement portion 84. As a result, the seal shoe 104 can retain its floating characteristics and can maintain a better seal.

While the foregoing description relates generally to a gas turbine engine, the gas turbine engine may be implemented in various environments. For example, the engine may be implemented in an aircraft, but may also be implemented in non-aircraft applications, such as power generating stations, marine applications, or oil and gas production applications. Thus, the present disclosure is not limited to use in aircraft.

Further aspects of the present disclosure are provided by the subject matter of the following clauses.

A seal assembly for a gas turbine, the seal assembly including a seal case, and a seal shoe arranged within the seal case, the seal shoe including (1) a main seal portion that is configured to engage with a radial bearing engagement portion of a rotor shaft, (2) a radial bearing surface that engages with the radial bearing engagement portion of the rotor shaft, (3) at least one hydrodynamic lift cavity extending through the radial bearing surface, and (4) at least one airflow passage extending from a first side of the seal shoe through the at least one hydrodynamic lift cavity and providing airflow communication between the first side of the seal shoe and the at least one hydrodynamic lift cavity.

The seal assembly according to the preceding clause, wherein the radial bearing surface includes an abradable coating.

The seal assembly according to any preceding clause, wherein the at least one hydrodynamic lift cavity is one of a circular shaped cavity, a rectangular shaped cavity, triangular shaped cavity, or a chevron shaped cavity.

The seal assembly according to any preceding clause, wherein the seal shoe is additively manufactured.

The seal assembly according to any preceding clause, wherein the seal assembly is arranged at an inner end of at least one stator vane connected to a stator housing surrounding the rotor shaft.

The seal assembly according to any preceding clause, wherein seal assembly is configured for use in a gas turbine, the first side of the seal shoe is a high pressure side, and a second side of the seal shoe is a low pressure side, and, the seal assembly is configured to provide a leakage airflow to the at least one airflow passage and to the at least one hydrodynamic lift cavity to provide a hydrodynamic lift function between the seal shoe and the radial bearing engagement portion of the rotor shaft.

The seal assembly according to any preceding clause, wherein the at least one hydrodynamic lift cavity includes a filament element arranged within the hydrodynamic lift cavity, and the at least one airflow passage extends through the filament element.

The seal assembly according to any preceding clause, wherein the filament element is an abradable porous element having one of an open cell structure or a closed cell structure.

The seal assembly according to any preceding clause, wherein the filament element is an abradable fiber metal structure element.

The seal assembly according to any preceding clause, wherein the at least one hydrodynamic lift cavity comprises a plurality of hydrodynamic lift cavities including a first hydrodynamic lift cavity and a second hydrodynamic lift cavity spaced apart in a first direction from the first hydrodynamic lift cavity.

The seal assembly according to any preceding clause, wherein the plurality of hydrodynamic lift cavities includes a first plurality of the first hydrodynamic lift cavities spaced apart from each other in a third direction, and a second plurality of the second hydrodynamic lift cavities spaced apart from each other in the third direction.

The seal assembly according to any preceding clause, wherein the at least one airflow passage includes a plurality of branched airflow passages including a first branched airflow passage providing airflow communication with the first hydrodynamic lift cavity, and a second branched airflow passage providing airflow communication with the second hydrodynamic lift cavity.

The seal assembly according to any preceding clause, wherein the plurality of branched airflow passages further includes at least one secondary airflow passage in airflow communication with the at least one airflow passage and extending through the radial bearing surface, the seal shoe further including at least one wear cap within the at least one secondary airflow passage at the radial bearing surface that closes off airflow communication through the at least one secondary airflow passage at the radial bearing surface.

The seal assembly according to any preceding clause, wherein the at least one wear cap is configured to open airflow communication through the at least one secondary airflow passage in a case when a thickness of the at least one wear cap is reduced to cause the at least one secondary airflow passage to be exposed through the radial bearing surface.

The seal assembly according to any preceding clause, wherein the plurality of hydrodynamic lift cavities further includes a third hydrodynamic lift cavity spaced apart in a second direction from the first hydrodynamic lift cavity, and a fourth hydrodynamic lift cavity spaced apart in the second direction from the second hydrodynamic lift cavity.

The seal assembly according to any preceding clause, wherein the first hydrodynamic lift cavity and the second hydrodynamic lift cavity are open hydrodynamic lift cavities having a first side that is open through the radial bearing surface, and the third hydrodynamic lift cavity and the fourth hydrodynamic lift cavity are closed hydrodynamic lift cavities contained within the seal shoe.

The seal assembly according to any preceding clause, wherein the plurality of hydrodynamic lift cavities includes a first plurality of the first hydrodynamic lift cavities spaced apart from each other in a third direction, and a second plurality of the second hydrodynamic lift cavities spaced apart from each other in the third direction, a third plurality of the third hydrodynamic lift cavities spaced apart from each other in the third direction, and a fourth plurality of the fourth hydrodynamic lift cavities spaced apart from each other in the third direction.

The seal assembly according to any preceding clause, wherein each of the first hydrodynamic lift cavities and the second hydrodynamic lift cavities are open hydrodynamic lift cavities having a first side that is open through the radial bearing surface, and each of the third hydrodynamic lift cavities and the fourth hydrodynamic lift cavities are closed hydrodynamic lift cavities contained within the seal shoe.

The seal assembly according to any preceding clause, wherein the at least one hydrodynamic lift cavity includes a plurality of hydrodynamic lift cavities including a first group of hydrodynamic lift cavities arranged, in a first direction, at a first distance from the first side of the seal shoe, a second group of hydrodynamic lift cavities arranged, in the first direction, at a second distance greater than the first distance from the first side of the seal shoe, and a third group of hydrodynamic lift cavities arranged, in the first direction, at a third distance greater than the second distance from the first side of the seal shoe.

The seal assembly according to any preceding clause, wherein each of the first group of hydrodynamic lift cavities and the third group of hydrodynamic lift cavities includes an open hydrodynamic lift cavity having a radially inner side extending through the radial bearing surface, and a closed hydrodynamic lift cavity arranged within the seal shoe radially outward of the open hydrodynamic lift cavity, and the second group of hydrodynamic lift cavities includes a first closed hydrodynamic lift cavity arranged within the seal shoe radially outward of the radial bearing surface and a second closed hydrodynamic lift cavity arranged radially outward of the first closed hydrodynamic lift cavity.

We claim:

1. A seal assembly for a gas turbine, the seal assembly comprising:
   a seal case; and
   a seal shoe arranged within the seal case, the seal shoe including (1) a main seal portion that is configured to engage with a radial bearing engagement portion of a rotor shaft, (2) a radial bearing surface that engages with the radial bearing engagement portion of the rotor shaft, (3) at least one hydrodynamic lift cavity extending through the radial bearing surface, and (4) at least one airflow passage extending from a first side of the seal shoe through the at least one hydrodynamic lift cavity and providing airflow communication between the first side of the seal shoe and the at least one hydrodynamic lift cavity,
   wherein the at least one hydrodynamic lift cavity includes a filament element arranged within the hydrodynamic lift cavity, and the at least one airflow passage extends through the filament element.

2. The seal assembly according to claim 1, wherein the at least one hydrodynamic lift cavity is one of a circular-shaped cavity or a rectangular-shaped cavity.

3. The seal assembly according to claim 1, wherein the seal shoe is additively manufactured.

4. The seal assembly according to claim 1, wherein the seal assembly is arranged at an inner end of at least one stator vane connected to a stator housing surrounding the rotor shaft.

5. The seal assembly according to claim 1, wherein the seal assembly is configured for use in a gas turbine, the first side of the seal shoe is a high pressure side, and a second side of the seal shoe is a low pressure side, and, the seal assembly is configured to provide a leakage airflow to the at least one airflow passage and to the at least one hydrodynamic lift cavity to provide a hydrodynamic lift function between the seal shoe and the radial bearing engagement portion of the rotor shaft.

6. The seal assembly according to claim 1, wherein the filament element is an abradable porous element having one of an open cell structure or a closed cell structure.

7. The seal assembly according to claim 1, wherein the filament element is an abradable fiber metal structure element.

8. The seal assembly according to claim 1, wherein the at least one hydrodynamic lift cavity comprises a plurality of hydrodynamic lift cavities including a first hydrodynamic lift cavity and a second hydrodynamic lift cavity spaced apart in a first direction from the first hydrodynamic lift cavity.

9. The seal assembly according to claim 8, wherein the plurality of hydrodynamic lift cavities includes a first plurality of the first hydrodynamic lift cavities spaced apart from each other in a second direction, and a second plurality of the second hydrodynamic lift cavities spaced apart from each other in the second direction.

\* \* \* \* \*